(No Model.)
S. J. WEATHERS.
COMBINED BARREL RACK AND TRUCK.
No. 436,619. Patented Sept. 16, 1890.
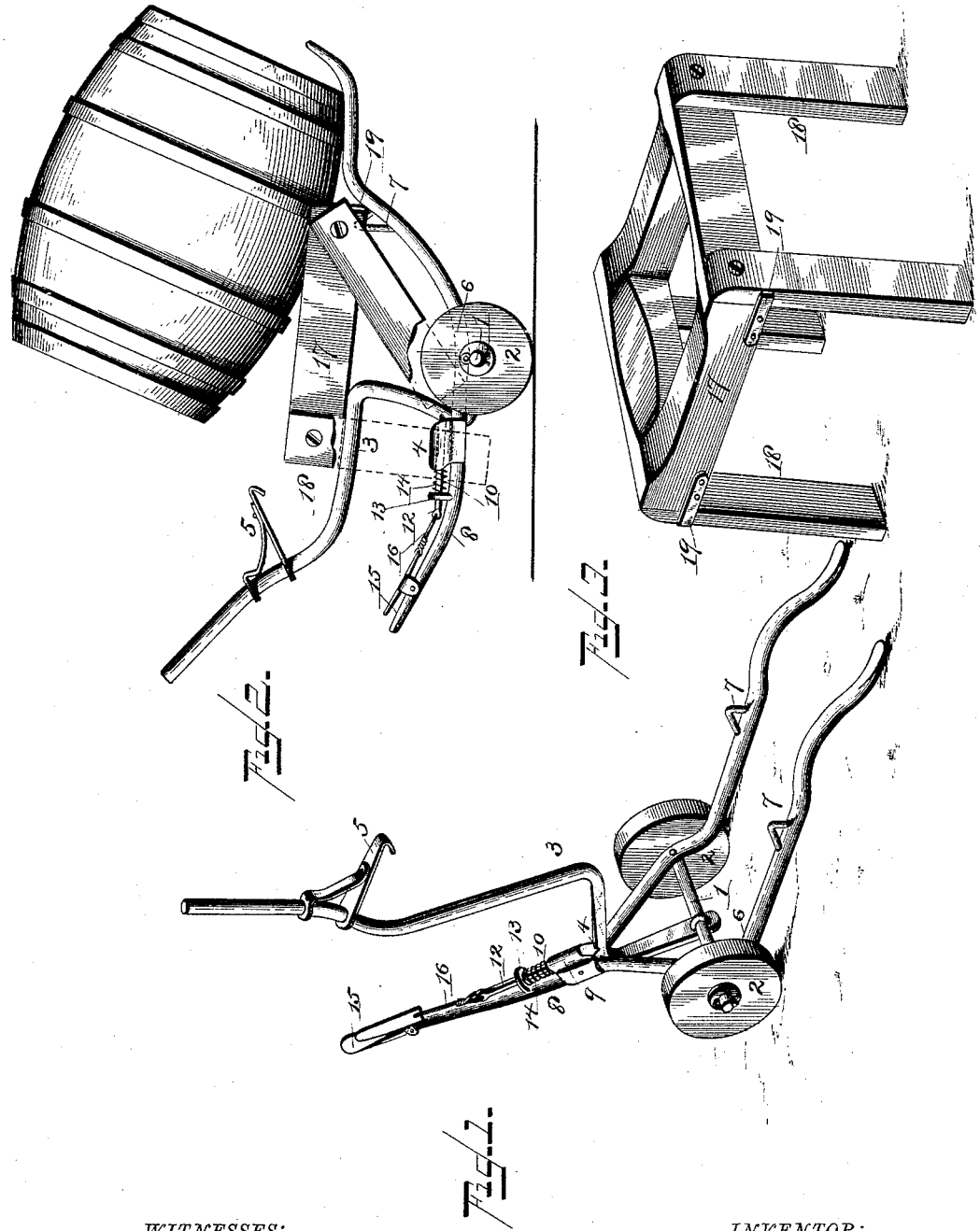
WITNESSES:
F. L. Durand
W. L. Coombs
INVENTOR:
Samuel J. Weathers
J. Lewis Ragger & Co.
Attorneys

UNITED STATES PATENT OFFICE.

SAMUEL J. WEATHERS, OF HOUSTONIA, MISSOURI.

COMBINED BARREL RACK AND TRUCK.

SPECIFICATION forming part of Letters Patent No. 436,619, dated September 16, 1890.

Application filed May 7, 1890. Serial No. 350,941. (No model.)

*To all whom it may concern:*

Be it known that I, SAMUEL J. WEATHERS, a citizen of the United States, and a resident of Houstonia, in the county of Pettis and State of Missouri, have invented certain new and useful Improvements in a Combined Barrel Rack and Truck; and I do hereby declare that the following is a full, clear, and exact description of the invention, which will enable others skilled in the art to which it appertains to make and use the same, reference being had to the accompanying drawings, which form a part of this specification.

My invention relates to improvements by means of which a barrel may be placed upon a rack and the rack and barrel then moved to any place desired, when they can be readily removed therefrom.

The object of the invention is to provide a cheap, durable, and efficient apparatus of the above description; and it consists in the novel construction and combination of parts, hereinafter fully described and claimed.

In the accompanying drawings, Figure 1 is a perspective view of a truck constructed in accordance with my invention. Fig. 2 is a side elevation of the truck, showing the same in the act of placing a barrel on the rack, part of the rack being broken away. Fig. 3 is a perspective view of the rack.

In the said drawings the reference-numeral 1 designates the axle of the truck, and 2 the wheels mounted thereon. Centrally upon this axle is loosely mounted the backwardly-extending elbow-lever 3, having a notch 4. Near its upper or free end this lever is provided with a hooked arm 5, which is designed to engage with the chine of a barrel in placing it upon the rack, as will hereinafter appear. Secured to the axle at each side thereof are the arms 6. These arms extend forwardly, where they are curved, as shown, so as to catch under a barrel, and are provided with catches or stops 7. At their rear ends these arms are united, forming a single bar 8, which is provided with a housing 9, inclosing a pawl 10, which engages with the notch 4 in the lever 3. At its rear this pawl is pivotally connected with the rod 12, which reciprocates in a lug 13, fixed to bar 8, and has connected with it a coiled spring 14, the tendency of which is to press the pawl into engagement with the notch in the lever. At its free end the bar 8 is provided with a treadle or foot-lever 15, connected by means of a wire or rod 16 with the rod 12. The rack employed in connection with this truck is shown in Fig. 3. It consists of the square or rectangular frame 17, supported by means of four legs 18, the two back ones of which are pivoted to said frame and provided with projecting stops 19, which limit their outward movement.

The operation is as follows: When it is desired to place a barrel upon the rack, the truck is run thereunder and the back legs of the rack turned upon their pivots until the stops 7 limit the movement of the rack. The front ends of the arms 6 are then inserted underneath the barrel and the latter tilted over until it rests upon the rack, the hooked arm 5 engaging with the chine of the barrel, so as to hold the same securely in place. The lever 3 is then depressed, elevating the rack and barrel until they assume a horizontal position, and the lever then locked by the pawl 10, engaging with the notch 4 of the lever. The rack is now supported upon the truck and can be moved to any place desired. To disengage the truck from the rack, the foot-lever or treadle is depressed, withdrawing the pawl from the notch, when the rack will be lowered to the floor.

From the above it will be seen that the apparatus is simple, durable, and economical, and that it will perform the work for which it is designed in an efficient manner.

Having thus described my invention, what I claim is—

1. In a truck, the combination, with the wheels and axle, of the backwardly-extending elbow-lever loosely mounted on the axle, the forwardly-extending curbed bifurcated arms fixed to the axle, the rearwardly-extending arm connected to or formed with the bifurcated arms, and means, substantially as described, for connecting and disconnecting said bar and the lever, as and for the purpose set forth.

2. In a truck, the combination, with the wheels and axle, of the curved bifurcated arms having stops or catches 7, the bar 8, the lever 3, loosely mounted on the axle and provided with the hooked arm 5, and means, substantially as described, for connecting and disconnecting the lever 3 and bar 8, substantially as described.

3. In a truck, the combination, with the wheels and axle, of the lever 3, loosely mounted on the axle, having notch 4 and provided with the hooked arm 5, the curved bifurcated arms 6, having stops 7, the bar 8, connected with said arms, the pawl 10, connecting rod 12, coiled spring 14, treadle 15, and connection 16, substantially as described.

4. The barrel-rack consisting of the rectangular frame, the pivoted legs, and stops for limiting the outward movement of the legs, substantially as described.

In testimony that I claim the foregoing as my own I have hereunto affixed my signature in presence of two witnesses.

SAMUEL J. WEATHERS.

Witnesses:
JAMES M. ROBERTS,
FRANK BERRY.